United States Patent
Fujinami et al.

(10) Patent No.: US 7,260,464 B2
(45) Date of Patent: Aug. 21, 2007

(54) VEHICLE BRAKING CONTROL DEVICE

(75) Inventors: Hiroaki Fujinami, Susono (JP); Shiro Monzaki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/685,397

(22) Filed: Oct. 16, 2003

(65) Prior Publication Data

US 2004/0088097 A1 May 6, 2004

(30) Foreign Application Priority Data

Nov. 5, 2002 (JP) ............................. 2002-320791

(51) Int. Cl.
*G06F 19/00* (2006.01)

(52) U.S. Cl. ....................................................... 701/70

(58) Field of Classification Search .................. 701/41, 701/70, 71–75, 78–80, 82–84, 91, 93, 96; 180/274–275

See application file for complete search history.

(56) References Cited

U.S. PATENT DOCUMENTS

| | | | |
|---|---|---|---|
| 6,275,772 | B1 | 8/2001 | Sugimoto et al. |
| 2001/0020217 | A1* | 9/2001 | Matsuno ...................... 701/301 |
| 2002/0091479 | A1* | 7/2002 | Maruko et al. ............... 701/96 |
| 2003/0067219 | A1* | 4/2003 | Seto et al. ................... 303/193 |

FOREIGN PATENT DOCUMENTS

| | | |
|---|---|---|
| DE | 199 48 365 A1 | 5/2000 |
| EP | 1 174 731 A2 | 1/2002 |
| EP | 1 251 060 A2 | 10/2002 |
| JP | A-60-248466 | 12/1985 |
| JP | A 2-246838 | 10/1990 |
| JP | A 6-298022 | 10/1994 |
| JP | A-7-25325 | 1/1995 |
| JP | A-10-138894 | 5/1998 |
| JP | A-10-310045 | 11/1998 |
| JP | 11-203598 | 7/1999 |
| JP | A-11-203598 | 7/1999 |

* cited by examiner

*Primary Examiner*—Thu V. Nguyen
(74) *Attorney, Agent, or Firm*—Oliff & Berridge, PLC

(57) ABSTRACT

A device for controlling a braking force of the vehicle has a braking force boosting control portion that increases the braking force in response to a detection of a possibility of a collision with an obstacle in the driving course of the vehicle, and a boost-reducing control portion that controls the boosting control portion so as to reduce the braking force when a steering operation is executed by a driver of the vehicle as compared to a braking force to be generated when no steering operation is executed. The braking forces on individual wheels are reduced depending upon the lateral force on the corresponding wheel. In the device, the precrash safety braking operation does not interfere with the steering operation of the driver so that the steering controllability may be ensured while the vehicle is slowed down.

3 Claims, 6 Drawing Sheets

VEHICLE BRAKING CONTROL DEVICE

BACKGROUND OF THE INVENTION

1. Field of the Invention

The present invention relates to a device for controlling a brake of a vehicle such as an automobile, and more specifically, to such a device that increases braking forces applied to wheels of a vehicle for avoiding a collision with an obstacle in front of the vehicle.

2. Description of Prior Art

For safety in driving a vehicle, a device for detecting a risk (possibility) of a collision with an obstacle has been equipped on an individual vehicle. Such a device monitors a distance and a velocity of an obstacle (e.g. another vehicle) in the vehicle's driving course relative to the vehicle with e.g. a radar sensor system provided near the front or head lights of the vehicle. When the distance (relative distance) between the vehicle and obstacle getting close to each other at a relative velocity becomes too short, namely when a risk of a collision is detected, the device will warn the driver of the collision, prompting him to slow down his vehicle by a braking operation and/or to change the vehicle's driving course by a steering operation. Some of recent devices make a vehicle slow down in response to a detection of a possibility of a collision by applying a braking force to the vehicle automatically (irrespective of the driver's braking operation) or by boosting up the factor of a braking pressure to a brake pedal depression. These braking controls are often referred to as "Precrash Safety Control". Examples of such devices are seen in Japanese Laid-Open Patent Publications (JP) Nos. 60-91500, 6-298022, 10-297452 11-203598, and 2002-59820.

Braking operation in the precrash safety control should be started when a relative distance is long enough for slowing down, and preferably, stopping a vehicle before colliding against an obstacle. As readily understood, the longer relative distance is required at the higher relative velocity for avoiding a collision with an obstacle. Further, JP 6-2988022, filed by the same assignee as the present application, has revealed that a distance required for avoiding a collision with an obstacle also depends upon ways of avoiding a collision. In this publication, using a simplified model, calculated as a function of a relative velocity were the shortest relative distances required for avoiding the collision only by braking operation (collision Avoidable Limit by Braking: BAL) and only by steering operation (collision Avoidable Limit by Steering: SAL), respectively. Then, it has been found that, qualitatively, BAL is shorter than SAL in the range of low relative velocity and vice versa in the range of high relative velocity, showing that, at a high relative velocity, a collision can be avoided by appropriate steering operation even when the relative distance falls below BAL.

It should be also considered in determining the timing of starting the precrash safety control that the braking operation may reduce a lateral or cornering force available on a wheel, so that premature and excessive braking operation would deteriorate the steering controllability or the course-tracking ability of a vehicle, leading to restriction of the driver's steering action for avoiding an obstacle. Thus, for fully ensuring the steering controllability, in the device shown in JP6-298022, automatic braking operation is executed only when a relative distance is shorter than both BAL and SAL, and thereby the driver can steer his vehicle as long as any effective way of avoiding a collision is available. JP 11-203598 modified the device in the aforementioned publication such that, in the range of low relative velocity, automatic braking operation is started at a certain braking level when a relative distance falls below SAL.

In the devices as described above, a collision would be effectively avoided as long as an appropriate steering operation is executed or executable by the driver. However, in the range of high relative velocity, the automatic braking operation, executed after the relative distance falls below SAL, would be too late to stop a vehicle before colliding against an obstacle because SAL is often far lower than BAL. In the range of low relative velocity, the stronger braking force or the rapider braking operation would be required for the higher relative velocity at which the relative distance falls below BAL. Strong or rapid braking operation often causes a rear-end collision with a following vehicle.

Further, in the aforementioned publication, no braking operation is executed unless the steering operation is ineffective for avoiding a collision because braking operation would reduce the steering controllability. However, the braking operation is not always harmful in steering operation for avoiding a collision. For instance, when a relative distance falls in the range below BAL but above SAL at a high relative velocity, the precrash safety braking operation at a certain level would reduce the relative velocity, resulting in the increase of the time for a vehicle to reach to an obstacle, so that the driver may steer the vehicle more easily for avoiding the obstacle. At a low relative velocity, theoretically, the lowering of the relative velocity by the precrash safety braking could recover the ability of steering operation for avoiding a collision.

It should be also noted that the steering controllability may be ensured unless excessive braking forces are applied on wheels. A lateral force generated on a wheel varies within the maximum available frictional force on the wheel, depending on a steering angle controlled by the driver's operation. Thus, a braking force may be increased until the resultant force of the lateral and braking forces reaches to the maximum frictional force, while ensuring a cornering force requested by the driver through his steering handle, i.e. the steering controllability.

Accordingly, the precrash safety control may be improved to function more effectively for avoiding a collision with an obstacle and/or reducing damage upon collision, considering the relation between the steering controllability and effects of the braking operation.

SUMMARY OF INVENTION

According to the present invention, there is provided a novel vehicle braking control device for the precrash safety control, improving its collision avoiding effect, i.e. the effect for avoiding a collision with an obstacle in the vehicle's driving course and/or reducing the damage of the vehicle even if a collision happens.

In one aspect of the present invention, a device for controlling a braking force of the vehicle comprises a braking force boosting control portion that increases the braking force in response to a detection of a possibility of a collision with an obstacle in the driving course of the vehicle; and a boost-reducing control portion that controls the boosting control portion so as to reduce the braking force when steering operation is executed by a driver of the vehicle as compared to a braking force to be generated when no steering operation is executed.

The steering controllability of a vehicle may be ensured as long as a cornering force is effectively generated by steering operation. Thus, in the device of the present invention as described above, the braking force to be generated during the precrash safety control (i.e. when a possibility of a collision is detected) under the control of the braking force boosting control portion is reduced or restricted when the driver is steering his vehicle, thereby avoiding or restricting the reduction of cornering force due to the increase of the braking force and allowing the driver to avoid a collision by steering his vehicle. This reduction of the braking force in response to the presence of steering operation may be applied irrespective of the degree of a relative velocity. The presence of steering operation by the driver may be detected from either of an absolute steering angle, its time differential, a yaw rate of the vehicle or the combination thereof. In the absence of steering operation, the braking force may be applied at the maximum level for reducing the relative velocity as quickly as possible in order to stop the vehicle before reaching to the obstacle.

According to the above-described device of the present invention, the relative velocity is reduced by the braking operation while the steering controllability is ensured so that a collision can be avoided more easily by the combination of the steering operation of the driver and the precrash safety braking operation, as compared to the prior devices. In this connection, in the device, it is expected that the possibility of the collision disappears during the braking and steering operations. Thus, if the relative distance falls below both SAL and BAL, namely, when there is no effective way to avoid the collision, the maximum braking force may be applied.

In another aspect of the present invention, a device for controlling a braking force of the vehicle comprises a braking force boosting control portion that increases the braking force in response to a detection of a possibility of a collision with an obstacle in a driving course of the vehicle; and a boost-reducing control portion that controls the boosting control portion so as to reduce the braking force when it is judged that the collision is avoidable by steering operation of a driver of the vehicle, as compared to a braking force to be generated when it is judged that the collision is inevitable by the steering operation.

According to the device described above, in a case that BAL is longer than SAL, i.e. usually, in the range of high relative velocity, braking operation is started for slowing down the vehicle when a relative distance falls below only BAL. The braking force should be applied at certain, but not the maximum, level so as to allow a cornering force to be generated effectively for ensuring the steering controllability. Consequently, even when the relative distance falls below SAL (for instance, the driver fails to steer his vehicle), it is expected that the vehicle has been slowed down, and thus the braking operation at the maximum available level can stop the vehicle without colliding against the obstacle. Even if a collision is inevitable, its damage will be reduced. In this connection, as described above, because of the decrease of the velocity, the time for the vehicle to reach to the obstacle will be increased: the driver is given a longer time for avoiding the collision. In order to ensure the avoidance of a collision at higher level, a possibility of a collision may be judged and braking operation may be started at a relative distance longer than BAL, irrespective of a relative velocity.

In the above device, the boost-reducing control portion may comprise a boost-restricting control portion that restricts a braking force to be generated when it is judged that the collision is avoidable through steering operation by a driver of the vehicle; and the boost-reducing control portion inhibits the boost-restricting control portion from restricting the braking force when it is judged that the collision is inevitable by the steering operation. Accordingly, when no effective way for avoiding the collision exists, the precrash safety braking operation is executed at the maximum level in order to reduce the damage due to the collision as much as possible.

When the resultant force of a lateral force and a braking force on a wheel reaches to its maximum frictional force, further increase of the braking force would reduce the lateral force, in turn, the steering controllability. However, as long as the cornering force required for the steering controllability of the vehicle is maintained or ensured, the braking force may be increased until the resultant force reaches to the maximum frictional force. That is, the available braking force depends upon the lateral force on the wheel.

Accordingly, in the aforementioned devices, the boost-reducing control portion may controls a reduction in the braking force based upon a lateral force on a steered wheel estimated from the steering operation of the driver and/or a motional condition of the vehicle. Preferably, the boost-reducing control portion increases the reduction in the braking force when the estimated lateral force on the steered wheel is high, as compared to the reduction in the braking force to be set when the estimated lateral force on the steered wheel is low. More preferably, the braking force applied during the precrash safety control may be reduced as the current lateral force on a wheel or its steering angle (slip angle) increases. The lateral forces on the individual wheels may be estimated from a yaw rate, a lateral acceleration of the vehicle, a steering angle or a combination thereof.

Braking operation for non-steered wheels may be also controlled based upon the lateral forces on the individual wheels. Usually, a non-steered wheel has a smaller slip angle than a steered wheel. Thus, the braking force available on a non-steered wheel while ensuring its cornering force will be larger than that on a steered wheel. Accordingly, in the aforementioned devices of the present invention, the boost-reducing control portion may control the boosting control portion so as to make the braking force on a steered wheel smaller than that on a non-steered wheel.

Thus, it is an object of the present invention to provide new and novel devices for controlling a brake of a vehicle for precrash safety control, improving the collision avoiding effect.

It is another object of the present invention to provide such devices wherein the precrash safety braking operation does not interfere with steering operation of the driver.

It is a further object of the present invention to provide such devices wherein the braking force in the precrash safety braking operation is reduced in response to the presence of steering operation by the driver in order to ensuring the steering controllability of a vehicle.

It is a further object of the present invention to provide such devices that slow down the vehicle speed when a possibility of a collision is detected while ensuring the steering controllability.

It is another object of the present invention to provide such devices that slow down the vehicle speed even when any way of avoiding a collision with an obstacle still exists, in order to stop the vehicle without colliding against the obstacle.

It is another object of the present invention to provide such devices that slow down the vehicle speed even when any way of avoiding a collision still exists, in order to extend the time for the vehicle to reach to an obstacle, thereby providing to the driver a longer time for steering his vehicle and/or depressing a brake pedal.

It is a yet further object of the present invention to provide such devices wherein a braking force applied during the precrash safety control varies dependent upon a lateral force, a steering angle or a slip angle of a wheel.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1A:
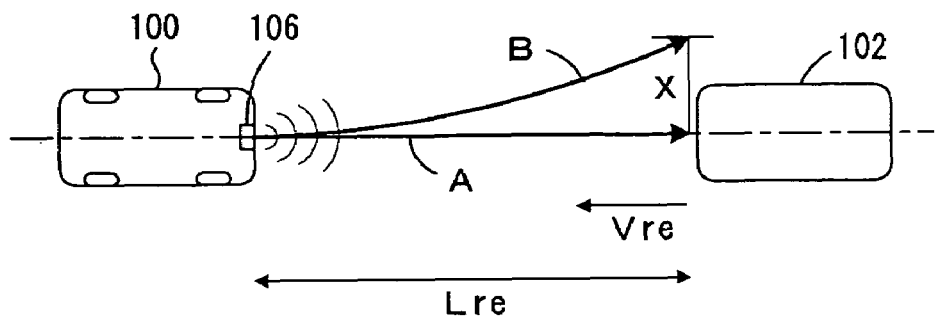
FIG. 1A is a drawing for explaining about a condition in which a collision of a vehicle with an obstacle (e.g. another vehicle) will occur and the precrash safety control will start in response to detection of the risk of the collision.

FIG. 1A illustrates a condition in which the precrash safety device of the present invention is to be operated, wherein a vehicle 100 running along an arrow A will collide with an obstacle 102 (e.g. another vehicle moving or standing still) without slowing the vehicle speed down and deviating from the driving course by a lateral distance X, as shown by an arrow B. In order to prevent the collision, the precrash safety control device will warn the driver of the risk of the collision and execute braking operation when a relative distance, Lre, between the vehicle 100 and obstacle 102 become equal to or shorter than the shortest distance required for avoiding the collision. As described above, the distance required for avoiding the collision varies, depending upon a relative velocity, Vre, (the difference of velocities) between the vehicle 100 and obstacle 102. Thus, as known in the art, the vehicle is provided, around its head light, with a radar system 106 that always monitors the relative distance Lre and relative velocity Vre of an obstacle in the direction of travel of the vehicle.

Figure 1B:
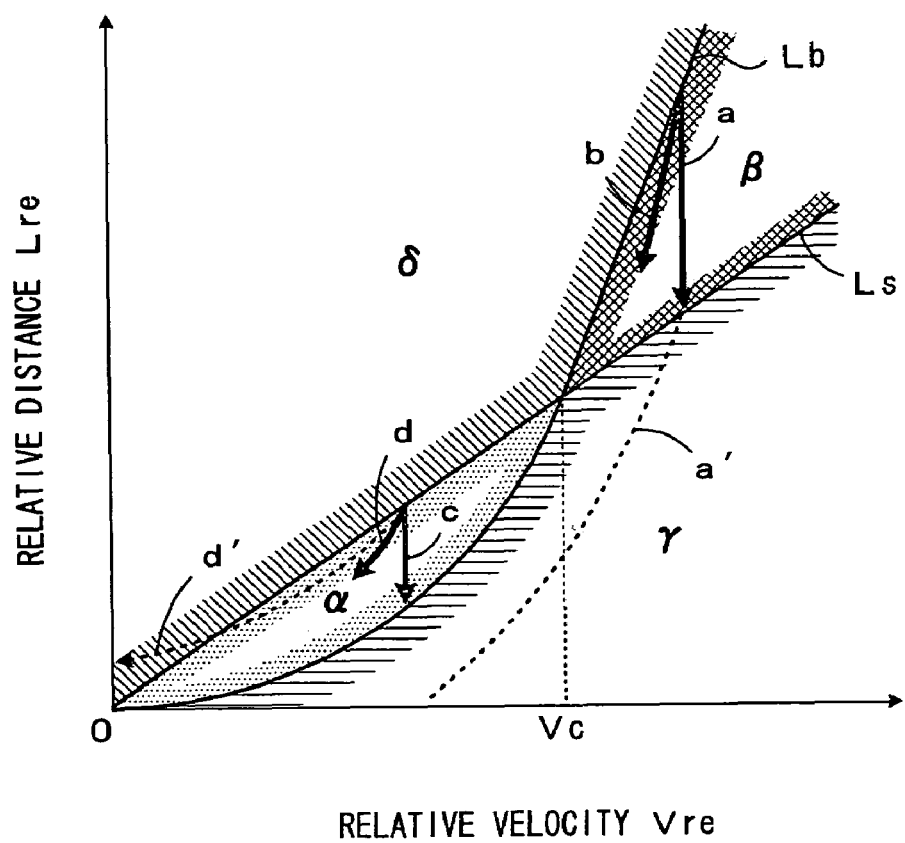
FIG. 1B shows an exemplary phase diagram, represented by relative velocity and relative distance between a vehicle and an obstacle in the driving course of the vehicle (as shown in FIG. 1A), showing conditions that a collision of the vehicle with the obstacle is avoidable or inevitable. Solid lines Lb, Ls indicate BAL and SAL, respectively.

Referring to FIG. 1B, a phase diagram of relative distance Lre versus relative velocity Vre between a vehicle and an obstacle is illustrated, showing conditions that a collision with the obstacle is avoidable or inevitable. In the diagram, a curved solid line Lb indicates BAL, and an almost straight solid line Ls, SAL. BAL is defined as a distance that a vehicle running initially at a relative velocity travels until the relative velocity becomes zero after the starting of braking the vehicle at the maximum applicable level. SAL is defined as a distance that a vehicle running at a relative velocity travels until the vehicle laterally deviates from its initial course by the (relative) width of an obstacle (see X in FIG. 1A) after the starting of steering the vehicle at the maximum available steering angle. Accordingly, when a relative distance of a vehicle at a relative velocity is shorter than BAL (or SAL), the collision will be inevitable solely by braking (or steering) operation. In other words, BAL is the shortest distance required for avoiding a collision with the obstacle solely by braking operation; and SAL is the shortest distance required for avoiding a collision with the obstacle solely by steering operation.

As seen from the phase diagram of FIG. 1B, BAL and SAL cross each other at a certain relative velocity (Cross velocity) Vc: in the range of lower relative velocity, BAL is shorter than SAL, but in the range of higher relative velocity, SAL is shorter than BAL. Accordingly, the condition of a vehicle defined by relative velocity and relative distance has four phases, $\alpha$, $\beta$, $\gamma$ and $\delta$ as shown in FIG. 1B. In phase $\alpha$, a collision is avoidable solely by braking operation but not solely by steering operation; in phase $\beta$, a collision is avoidable solely by steering operation but not solely by braking operation. In phase $\gamma$, a collision is inevitable solely by either of the operations.

As described above, an excessive braking force would deteriorate the steering controllability of the vehicle, often completely, by reducing a lateral force on a wheel. Thus, in the aforementioned JP 6-298022, in order to prevent any braking operation from interfering with the steering controllability, automatic braking operation is executed at the maximum braking level only in phase $\gamma$. In JP 11-203598, in order to prevent the application of an abrupt braking force when the relative distance falls into phase $\gamma$ in the range of lower relative velocity (<Vc), automatic braking operation is executed in phase $\alpha$ at a reduced (and fixed) braking level, slowing down the vehicle while reserving the steering controllability at a certain level.

According to one of the features of the present invention, a vehicle will be decelerated in phases $\alpha$ and $\beta$, as well as phase $\gamma$, by executing braking operation or by boosting the braking force, improving the collision avoiding effect as described below.

Firstly, in the present invention, since the velocity is reduced by braking operation at a certain level as described below in detail, the time for steering, given to the driver, is extended, making the steering of the vehicle more easy than ever. For instance, when the relative distance of a vehicle falls below BAL at a high relative velocity (>Vc), without deceleration of the vehicle, the relative distance would be quickly shortened as shown in a bold arrow a. However, in the present invention, because of the reduction of the vehicle speed, the relative distance is shortened more slowly than in the former case with no braking operation, and does not reach to the steering limit as shown in a bold arrow b by the time at which the relative distance would reach to SAL in the former case. Thus, in the present invention, the driver is given a longer time for steering in order to avoid a collision as compared to the prior art. Similarly, at a low relative velocity (<Vc), the time for the relative distance to reach to BAL is extended by braking operation as shown by arrow d as compared to a case with no braking operation as shown by an arrow c. Under a certain condition, the relative distance will come back to phase δ, recovering a condition in that a collision is avoidable solely by steering operation as indicated by dotted line d'.

Secondly, in the present invention, the relative velocity at which the relative distance falls from phase α or β into phase γ is reduced so that damage due to a collision will be reduced. If the driver fails to execute an appropriate steering without braking, the vehicle condition would go down to the tip of arrow a, where it is too late to stop the vehicle by any braking operation (as shown by a dotted line a'). As readily understood, the speed at which the vehicle collides with an obstacle should be as low as possible. Thus, the application of braking force before falling into phase γ as in the present invention is preferable. At a low relative velocity, the velocity at which the relative distance falls from phase α into phase γ should be as low as possible, in order to avoid abrupt braking operation even if the vehicle is able to stop before the obstacle.

According to another feature of the present invention, the strength of a braking force applied in the precrash safety control may be reduced in response to the presence of steering operation of the driver, based upon the lateral force on a wheel. Preferably, a braking force on an individual wheel is increased or decreased as a lateral force on the corresponding wheel is decreased or increased. The strength of the lateral force is determined through a steering angle by the driver. Thus, the steering controllability is ensured only when the driver intends to steer his vehicle, and in the absence of the driver's intension for steering, the precrash safety braking operation may be executed at its maximum level, slowing down the vehicle as quickly as possible. This lateral force dependent braking operation may be conducted in phase α and/or β.

In the following, a more practical embodiment realizing the present invention is described.

Figure 2:
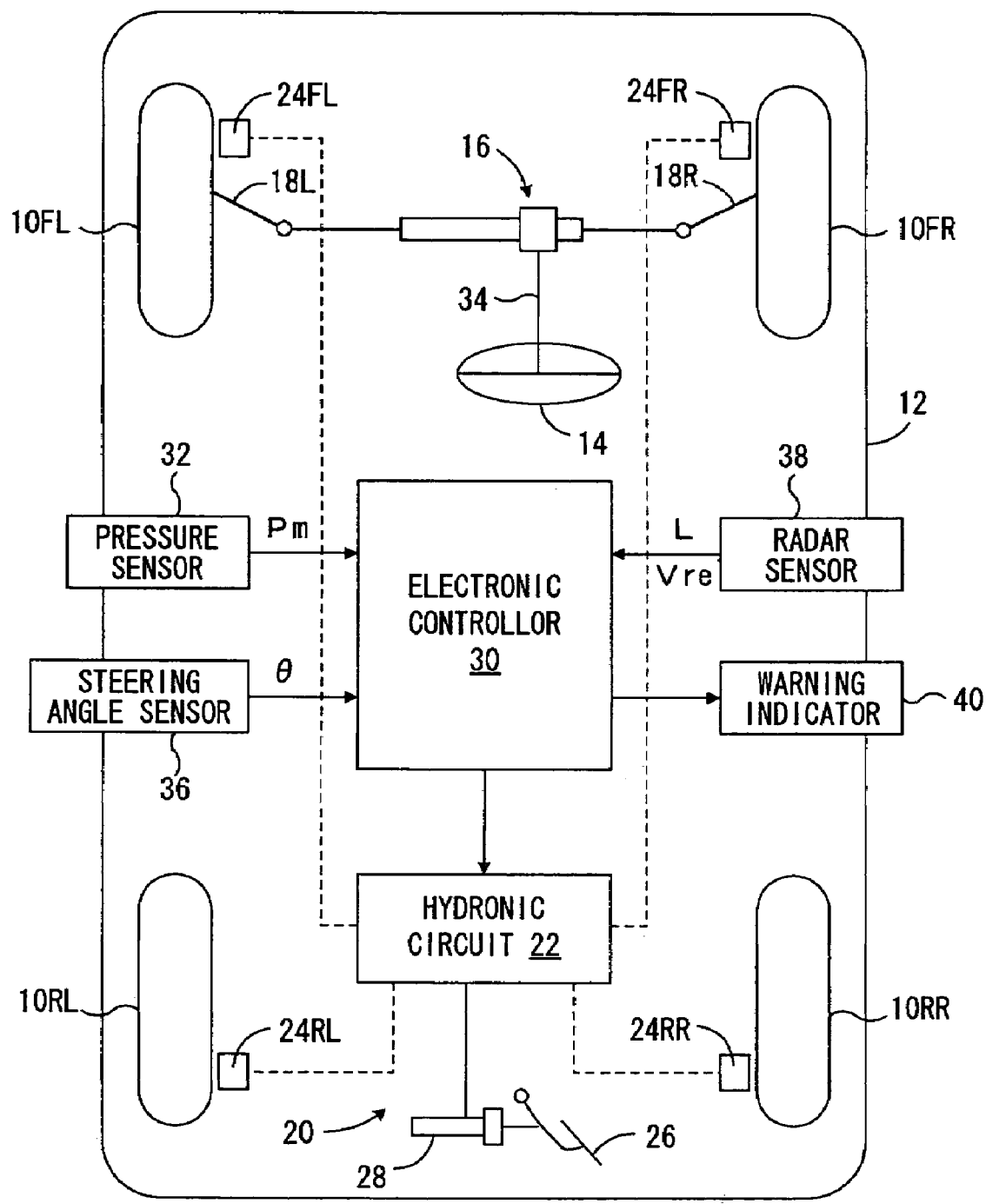
FIG. 2 is a diagrammatical view of a four wheel vehicle incorporating a vehicle braking control device executing a precrash safety control of a preferred embodiment according to the present invention.

FIG. 2 diagrammatically shows a four-wheel vehicle incorporating a precrash safety braking control device according to the present invention. The vehicle includes a vehicle body 12, front right wheel 10FR, front left wheel 10FL, rear right wheel 10RR and rear left wheel 10RL supporting the vehicle body 12 via the respective suspension means (not shown in the figure). The front right and front left wheels 10FR and 10FL are steered by a rack-and-pinion type power steering apparatus 16 according to a rotation of a steering wheel 14 by a driver via a pair of tie rods 18R and 18L. As usual, the vehicle is also provided with an engine adapted to output a driving torque according to a throttle valve opening in response to the depression of an acceleration pedal by the driver, and a transmission providing a driving force to the wheels through a differential gear system (not shown).

A brake system generally designated by 20 includes a hydraulic circuit means 22, a brake pedal 26 adapted to be depressed by the driver, a master cylinder 28 for supplying a master cylinder pressure to the hydraulic circuit means 22 according to the depression of the brake pedal by the driver, and wheel cylinders 24FR, 24FL, 24RR and 24RL each adapted to apply a braking force to each corresponding one of the front right, front left, rear right and rear left wheels according to a supply of a hydraulic pressure thereto from the hydraulic circuit means 22. The hydraulic circuit means 22 also has connection with an oil reservoir, an oil pump, etc. and various valves.

Electronic controller 30 incorporates a microcomputer which may be of an ordinary type including a central processor unit, a read only memory, a random access memory, input and output port means and a common bus interconnecting these elements (not shown) and function as the braking force control device for precrash safety control according to the present invention. The electronic controller 30 is supplied with a signal indicating steering angle θ of a steering shaft 34, attached to the steering wheel 14, detected with a steering angle sensor 36 mounted on a steering column; a signal indicating master cylinder pressure Pm detected with a pressure sensor 32 mounted on a master cylinder 28 and a signal from a radar sensor 38 for detecting the relative distance and relative velocity of an obstacle in the direction of travel of the vehicle using laser light, electromagnetic wave, etc. In addition to the above sensors, a yaw rate sensor, a longitudinal acceleration sensor, a lateral acceleration sensor, wheel speed sensors, etc. may be provided for controlling the braking operation. Signals indicating yaw rate, lateral acceleration, etc. may be used for detecting the presence of steering operation or lateral forces on the wheels. Further, optionally, a warning indicator 40 may be provided on a consol for the driver, indicating a possibility or a risk of a collision, when detected, under the control of the electronic controller 30.

The braking pressures Pbi (i=FR, FL, RR, RL) in wheel cylinders 24FR-24RL may be supplied directly from the master cylinder in a normal mode. In the precrash safety mode, i.e. when a possibility of a collision is detected, however, the braking pressures will be controlled by the electronic controller 30 through the hydraulic circuit 22. Accordingly, the electronic controller 30 has appropriate driving apparatus for controlling the hydraulic circuit 22 as well known in the art. In this connection, the braking pressures may be controlled by the electronic controller 30 even in the normal mode, and in this case, wheel cylinders may be hydraulically isolated from the master cylinder.

Figure 3:
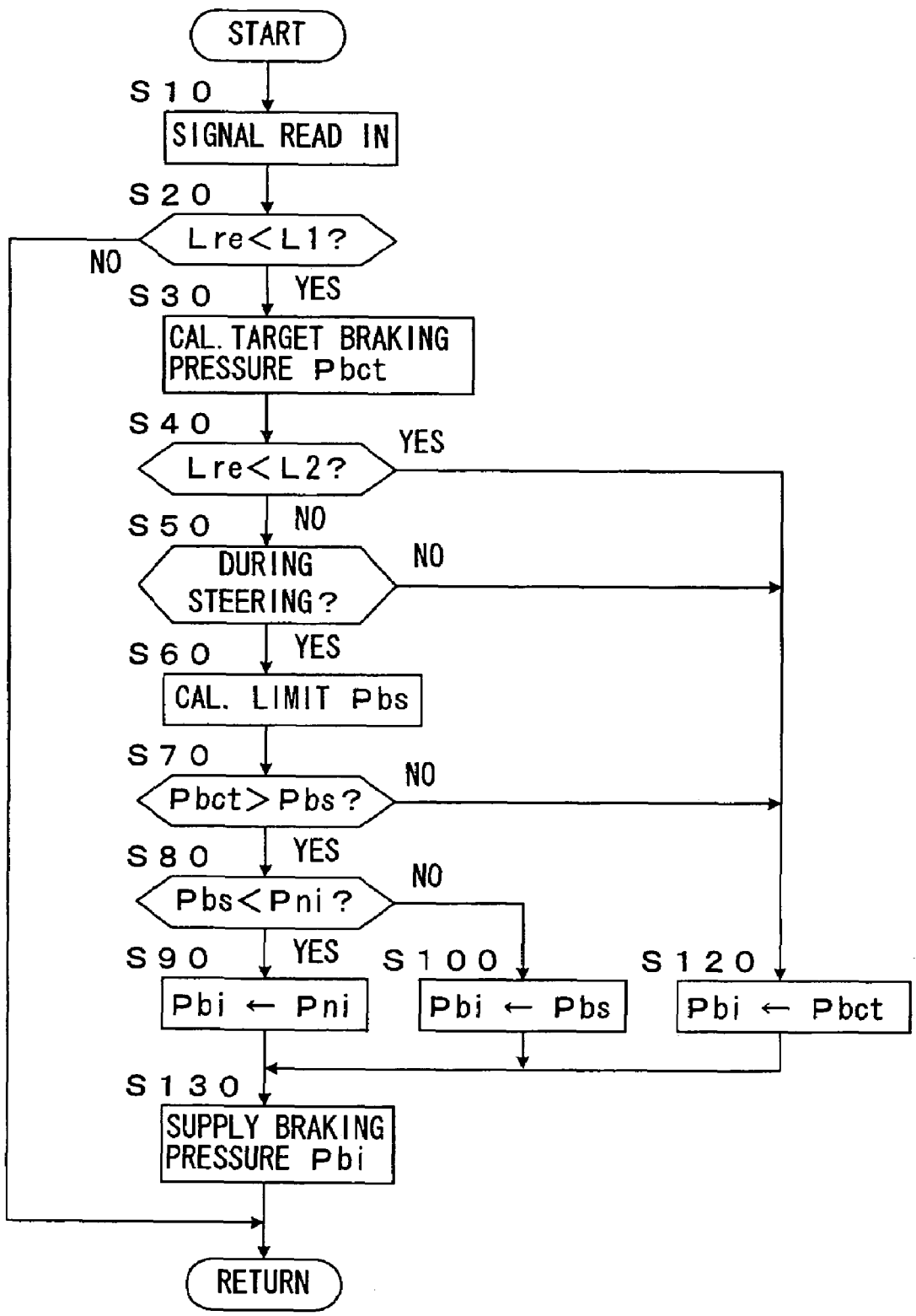
FIG. 3 is a flowchart showing a braking pressure control routine of the precrash safety control in the preferred embodiment according to the present invention.

In the followings, referring to FIG. 3, the operation of the precrash safety braking force control device, explained above with reference to FIGS. 1A and 1B, will be described. The control according to a control routine shown in FIG. 3 is started by a closure of an ignition switch (not shown in FIG. 2) and cyclically repeated at a cycle time such as tens of milli-seconds during the operation of the vehicle. In this routine, the device executes (i) the detection of a possibility of a collision; (ii) the judgment of phase of the vehicle condition; and (iii) the detection of steering operation; and, based upon the results of steps (i)-(iii), the lateral force dependent braking operation is conducted.

Firstly, in step 10, the signals shown in FIG. 2 are read in. Then, a relative distance Lre and a relative velocity Vre of an obstacle, if any, are calculated based upon the signals from the radar sensor 38. Accordingly, the relative distance and velocity are always monitored as long as the routine in FIG. 3 is executed.

Figure 4A:
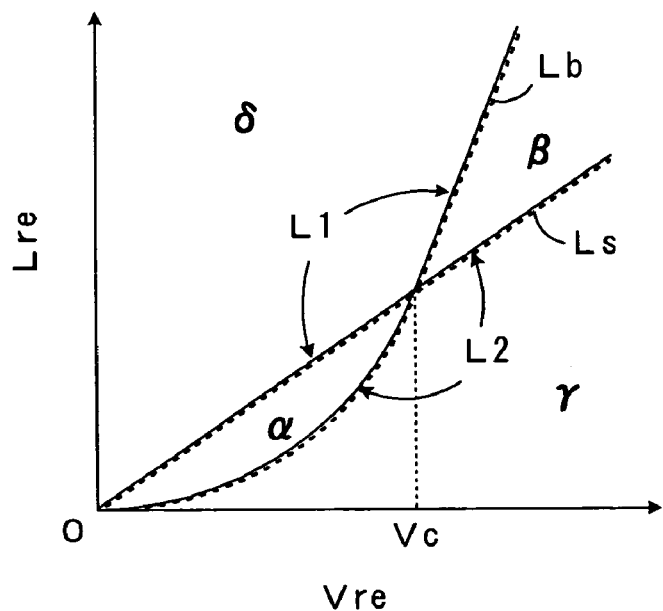
FIGS. 4A-D show maps of relative velocities and relative distances of an obstacle, used for detecting a possibility of a collision with the obstacle in the precrash safety control as shown in the flowchart of FIG. 3.
Figure 4B:
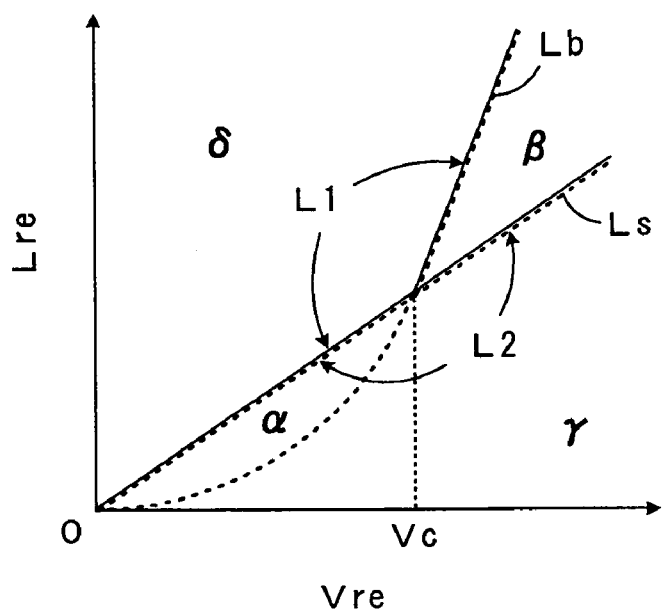
Figure 4C:
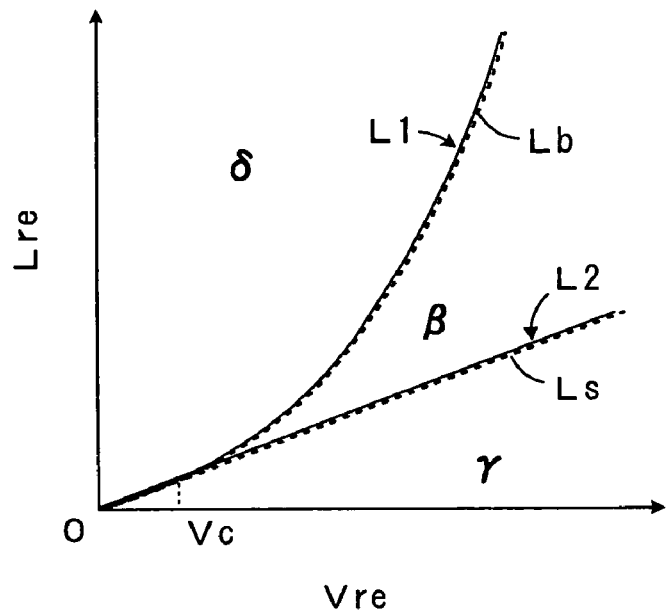
Figure 4D:
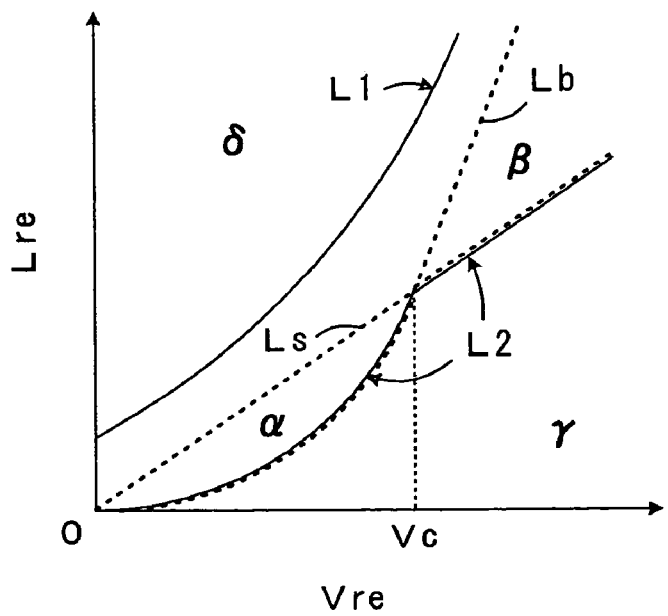

In step 20, based upon the relative distance Lre and relative velocity Vre, a possibility of a collision with an obstacle, if any, is detected. In the detection of the collision, either of maps shown in FIGS. 4A-4D may be used. Referring to FIGS. 4A and 4B, a solid line L1 is a first reference limit: when the monitored relative distance Lre falls below the first limit L1, it is judged that the vehicle will collide with the obstacle unless changing the course or slowing down. The first limit L1, as seen from the drawing, may be coincident with the longest one of SAL and BAL as shown in FIG. 1B. However, since the model used to obtain the phase diagram in FIG. 1B is too simplified for a practical use, the first limit L1 may be determined through experiments. For a rather heavy and large vehicle, such as a truck, substantially, in the whole range of relative velocity, BAL is longer than SAL. In such a case, the first limit L1 will be almost coincident with its BAL as shown in FIG. 4C. Further, as shown in FIG. 4D, the first limit L1 may be longer than the limits obtained from the model of FIG. 1B. In this connection, the width of an obstacle, if immeasurable in the present system, may be assumed to be an appropriate value through experiments, etc. If a possibility of a collision is detected, step 30 is executed. If not, the process returns to Start.

Figure 5:
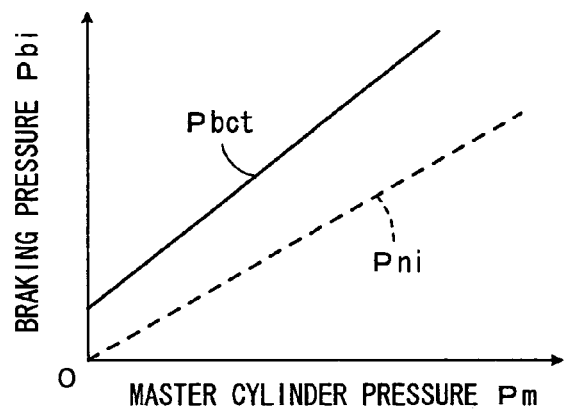
FIG. 5 is a graph showing the relations between a master cylinder pressure Pm and braking pressures Pni in a normal mode and Pbct in a precrash safety mode.

In step 30, a target braking pressure Pbct for precrash safety control is calculated for each wheel based upon the monitored master cylinder pressure Pm, using a map as shown in FIG. 5. As seen from FIG. 5, in the present system, the target braking pressure Pbct, starting from a non-zero value, in the precrash safety mode may be increased along with the master cylinder pressure. In other words, the factor of the braking pressure to the master cylinder pressure is boosted in the precrash mode as compared to a braking pressure in a normal mode Pni. Alternatively, as in JP 6-298022, the target braking pressure Pbct may be set to a fixed, appropriate or maximum available braking pressure. It should be noted as described below that the target braking pressure Pbct is not always supplied to the wheel cylinders as Pbi: Pbct is reduced to the limited target braking pressure Pbt during steering.

In step 40, by using either of the maps as shown in FIGS. 4A-4D again, it may be judged whether or not the monitored relative distance Lre is shorter than a second reference limit L2 in FIGS. 4A-4D, determining the phase of the current condition. If the relative distance falls below the second limit L2, the braking pressure Pbi or the boosting factor thereof may be increased to the maximum available level, i.e. Pbi←Pbct in step 120. If not, step 50 is conducted and the braking force is controlled based upon the steering angle or the lateral forces on wheels as described later in more detail.

The second limit L2 may be determined in various ways. For instance, as shown in FIGS. 4A and 4D, the second limit L2 may be coincident with the shorter one of BAL and SAL as shown in FIG. 1B. In this case, when any of effective ways of avoiding a collision exists, namely, in phases α and β (and the lower region of phase δ in FIG. 4D), the braking operation will be conducted at a level depending upon the steering angle or the lateral forces on wheels. In FIGS. 4B and 4C, the second limit L2 is substantially coincident with SAL in the whole range of relative velocity (that is, the first and second limits L1 and L2 are coincident with each other at a relative velocity lower than Vc). Thus, in this case, the braking pressures will be set to Pbct in phases α and γ (in FIG. 4C, phase α is substantially vanished); and controlled based upon the steering angle or the lateral forces on wheels only in phase β. The second limit may be also determined through experiments. The step 40 may be omitted if it is desired to ensure the steering controllability irrespective of the relative distance (In this case, the lateral force dependent braking operation will be always executed with Lre<L1 as described below.).

In step 50 where the condition of the vehicle represented by the relative distance and relative velocity falls into the region between the first and second limits, corresponding to phase α or β (or the lower region of phase δ in FIG. 4D), the presence of steering operation by the driver of the vehicle is judged. The presence of the steering operation may be judged when (1) the absolute value of the steering angle θ, (2) the absolute value of the changing rate (the time differential) of the steering angle θ, or (3) the yaw rate of the vehicle is larger than the corresponding relatively small reference value, as readily known by one of the ordinary skill in the art. Also, whether or not the driver is steering his vehicle may be determined based upon a combination of the above parameters (1), (2) and (3) in a manner as known in the art. For example, the changing rate of the steering angle may be used for the first-order delay compensation of the steering angle, as well known in the art. If no steering operation is detected, the braking pressure Pbi or the boosting factor thereof may be increased to the maximum available level, i.e. Pbi←Pbct in step 120.

In steps 60-120, determined is the braking pressure Pbi for each wheel in the presence of steering operation.

Figure 6A:
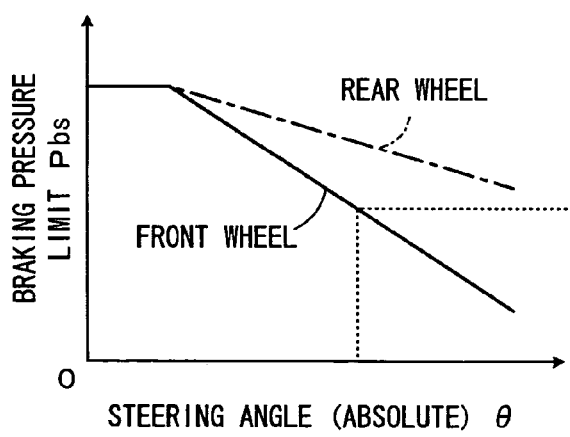
FIG. 6A is a graph of the limit of a braking force applied to a steered wheel (solid line) and a non-steered wheel (broken line) versus a steering angle during the precrash safety braking operation in the preferred embodiment according to the present invention.

First, in step 60, the limit Pbs of the braking pressure is calculated based upon the steering angle θ, by using a map as shown in FIG. 6A. As seen from FIG. 6A, the braking pressure limit Pbs decreases along with the increase of the steering angle. Since the steering angle corresponds to a lateral force on a wheel, the braking force limit Pbs is reduced as the lateral force is increased, thereby ensuring the generation of the lateral or cornering force during steering operation. The maximum of the limit Pbs around the steering angle of zero may be equal to or less than the target braking pressure Pbct. It should be also noted that the limit for a rear wheel or a non-steered wheel, as indicated by a broken line, is reduced moderately relative to a front wheel or a steered wheel. This is because the rear wheel has a smaller slip angle than the front wheel, and therefore the braking force may be higher as long as an effective cornering force is generated on the corresponding wheel.

Figure 6B:
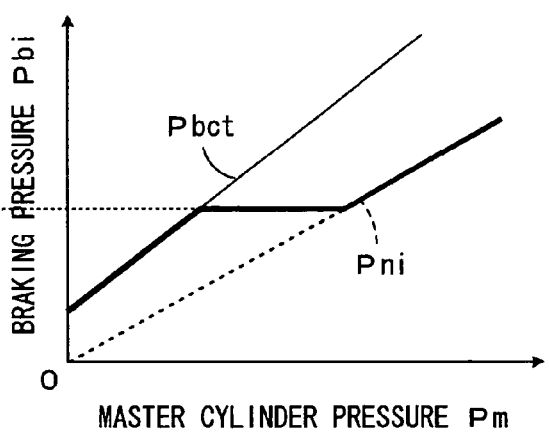
FIG. 6B is a graph similar to FIG. 5, in which a bold line illustrates a course of the braking pressure varying with the master cylinder pressure at a certain steering angle.

In step 70 to step 120, the braking pressure Pbi is set to as follows: until the target pressure Pbct (depending upon Pm) reaches to the limit Pbs, Pbi is set to Pbct (Step 70); when Pbct>Pbs>Pni, Pbi is set to Pbs, i.e. the braking pressure is restricted to the limit Pbs depending upon the steering angle when the boosted target pressure, Pbct, exceeds over the limit Pbs (Steps 80 and Step 100); when the braking pressure in the normal mode Pni exceeds over the limit Pbs, where the driver tries to operate strong braking operation by depressing the brake pedal, Pbi is set to Pni. This course of changing the braking pressure Pbi at a certain steering angle θ is illustrated in FIG. 6B. Accordingly, the braking force is restricted to the limit based upon the lateral force during steering, but if the driver intends to increase the braking force further, the limit is unlocked.

With respect to the map in FIG. 6A, the limit of braking pressure may be determined theoretically or experimentally so as to generate an effective cornering force on a wheel for the purpose of ensuring the steering controllability for avoiding a collision. Further, it should be understood by one of ordinary skill in the art that the braking pressure limit, Pbs, may be determined based upon a lateral force estimated in a manner known in the art or an index thereof, such as a lateral acceleration of the vehicle directly measured with a lateral acceleration sensor.

Then, in step 130, the braking pressure Pbi is supplied to the wheel cylinders. The process returns to Start.

Although the present invention has been described in detail with respect to preferred embodiments thereof and some partial modifications thereof, it will be apparent for those skilled in the art that other various modifications are possible with respect to the shown embodiments within the scope of the present invention.

The invention claimed is:

1. A device for controlling a braking force of a vehicle, the device comprising:

a braking force boosting control portion that increases the braking force in response to a detection of a possibility of a collision with an obstacle in a driving course of the vehicle; and a boost-reducing control portion that controls the boosting control portion so as to reduce the braking force when a steering operation is executed by a driver of the vehicle as compared to a braking force to be generated when no steering operation is executed, thereby reducing the braking force and allowing the driver to avoid a collision through the steering operation executed by the driver, wherein the boost-reducing control portion controls a reduction in the braking force based upon a lateral force on a steered wheel estimated from the steering operation by the driver and a motional condition of the vehicle, wherein the boost-reducing control portion controls the boosting control portion so that the braking force on a steered wheel is smaller than that on a non-steered wheel.

2. A device for controlling a braking force of a vehicle, the device comprising:

a braking force boosting control portion that increases the braking force in response to a detection of a first possibility of a collision with an obstacle in a driving course of the vehicle; and a boost-reducing control portion that controls the brake force boosting control portion so as to reduce the braking force when a steering operation is executed by a driver of the vehicle as compared to a braking force to be generated when no steering operation is executed as started from the detection of the first possibility until a second possibility is detected, the second possibility corresponding to a condition in which the collision with the obstacle is inevitable solely by either of a steering operation and a braking operation by the driver, the boost-reducing control portion canceling the reduction of the braking force when the second possibility is detected, wherein the boost-reducing control portion controls the braking force boosting control portion so that the braking force on a steered wheel is smaller than that on a non-steered wheel.

3. A device for controlling a braking force of a vehicle, the device comprising:

a braking force boosting control portion that increases the braking force in response to a detection of a possibility of a collision with an obstacle in a driving course of the vehicle; and a boost-reducing control portion that controls the brake force boosting control portion so as to reduce the braking force when it is judged that the collision is avoidable by either of a steering operation and a braking operation of a driver of the vehicle as compared to a braking force to be generated when it is judged that the collision is inevitable by the steering operation but to cancel the reduction of the braking force when it is judged thereafter that the collision is inevitable by either of the steering operation and the braking operation, wherein the boost-reducing control portion controls the braking force boosting control portion so that the braking force on a steered wheel is smaller than that on a non-steered wheel.

* * * * *